United States Patent [19]

Haisma et al.

[11] Patent Number: 4,932,754
[45] Date of Patent: Jun. 12, 1990

[54] MULTILAYER OPTICAL COMPONENT

[75] Inventors: Jan Haisma; Pieter van der Werf, both of Eindhoven, Netherlands

[73] Assignee: U.S. Philips Corp., New York, N.Y.

[21] Appl. No.: 318,506

[22] Filed: Mar. 2, 1989

Related U.S. Application Data

[63] Continuation of Ser. No. 801,368, Nov. 25, 1985, abandoned, which is a continuation-in-part of Ser. No. 658,109, Oct. 5, 1984, Pat. No. 4,679,892.

[30] Foreign Application Priority Data

Oct. 7, 1983 [NL] Netherlands .......................... 8303446
Dec. 17, 1984 [NL] Netherlands .......................... 8403816

[51] Int. Cl.⁵ ............................................. G02B 5/28
[52] U.S. Cl. .................................... 350/166; 350/164; 372/103
[58] Field of Search .................. 350/166, 164; 372/103

[56] References Cited

U.S. PATENT DOCUMENTS

| | | | |
|---|---|---|---|
| 2,304,754 | 12/1942 | Wainer | 350/166 UX |
| 3,451,740 | 6/1969 | Smith | 350/166 X |
| 3,569,858 | 3/1971 | Witteman et al. | 350/166 X |
| 3,666,351 | 5/1972 | Pao | 350/166 UX |
| 4,018,692 | 4/1977 | Akselrad et al. | 365/33 X |
| 4,099,840 | 7/1978 | Van der Wal et al. | 350/166 |
| 4,195,908 | 4/1980 | Kestigian et al. | 350/375 |
| 4,679,892 | 7/1987 | Haisma et al. | 350/96.12 |

FOREIGN PATENT DOCUMENTS 1019681 11/1952 France .................................. 350/164
2020842A 11/1979 United Kingdom .

OTHER PUBLICATIONS

Van der Ziel, J. P., et al, "Interference Filters: Single Crystal Multilayer AlAs–GaAs," *Applied Optics,* vol. 15, No. 5, May, 1976, pp. 1256–1257.
Arsen'ev, P., et al, "Growing Optical Films of Aluminum Yttrium Garnet," *Sov. Phys. Crystallogr.* 23(3), May–Jun. 1978, pp. 376–377 S9145 0095.

*Primary Examiner*—Bruce Y. Arnold
*Assistant Examiner*—Terry S. Callaghan
*Attorney, Agent, or Firm*—Ernestine C. Bartlett

[57] ABSTRACT

A multilayer optical component is provided in thin-film technology. The component comprises a monocrystalline substrate 1, for example a garnet substrate, which supports a stack 2 of monocrystalline layers 11–16, for example garnet layers, provided epitaxially on the substrate. The layers have alternately a high and a low refractive index and as regards thickness and refractive index are optimized to minimally or maximally reflect electromagnetic radiation of a given wavelength in the infrared or optical range of the spectrum. Said optical component is suitable in particular for use in high-power lasers.

36 Claims, 2 Drawing Sheets

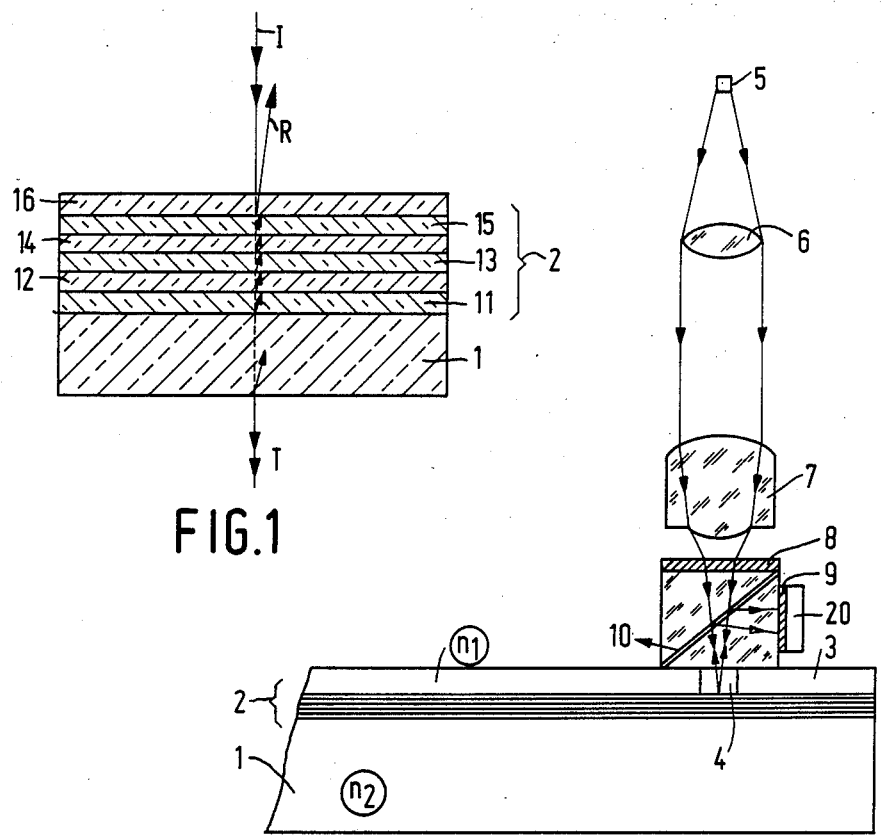
FIG.1
FIG.2
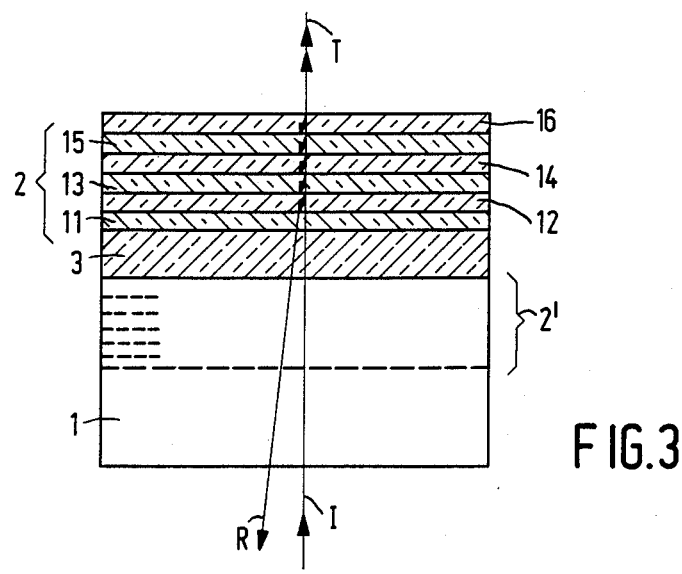
FIG.3

MULTILAYER OPTICAL COMPONENT

This is a continuation of application Ser. No. 801,368, filed Nov. 25, 1985, now abandoned, which is a continuation-in-part of application Ser. No. 658,109 filed Oct. 5, 1984, now U.S. Pat. No. 4,679,892 issued July 14, 1987.

FIELD OF THE INVENTION

The invention relates to a multilayer optical component in thin-film technology for handling electromagnetic radiation in the visible and/or infrared spectral range which is incident transversely to the plane of the component, having a substrate which supports a stack of thin-film layers with alternately a high and a low refractive index.

BACKGROUND OF THE INVENTION

An optical component for handling electromagnetic radiation which is incident transversely to the plane is to be understood to mean herein a system of layers having reflecting or anti-reflecting properties with regard to electromagnetic radiation of a given wavelength.

A system of layers having reflecting properties and constructed as a multilayer thin-film component is known from U.K. Patent Application No. GB-A 2,020,842. The reflector described in said Application comprises a number (7–9) of dielectric layers having alternately a high and low refractive index and thicknesses equal to $\frac{1}{4}\lambda$, where $\lambda$ is the wavelength of the radiation to be reflected. The layers have been vapour-deposited and consist alternately of kryolite and zinc sulphide, or alternately of thorium fluoride and zinc sulphide. The disadvantage of this known reflector is that it exhibits physical defects which are inherent in layers formed by vapour-deposition. They locally have an insufficiently low absorption in the wavelength range of the radiation to be reflected and are insufficiently homogeneous and so have scattering or absorption centres As a result of this they are unfit notably for use in mirrors for high-power lasers.

It is the object of the invention to provide a multilayer optical component of the type mentioned in the opening paragraph which is well fitted for use as a mirror for high-power lasers.

According to the invention a multilayer optical component is characterized in that the substrate is a monocrystalline substrate having a lattice constant $a_o$ and that the stack of thin-film layers consists of a number of monocrystalline layers which have been grown epitaxially on the substrate and have a lattice constant which is substantially equal to $a_o$.

A practical embodiment of the optical component in accordance with the invention is characterized in that the monocrystalline layers which, taken from the substrate, have an even number consist of the same material as the substrate. The phrase "taken from the substrate" as used herein means counting from the substrate with the substrate being numbered zero.

Within the scope of the invention the substrate may, for example, consist of monocrystalline gallium phosphide. Monocrystalline layers of alternately silicon and gallium phosphide may have been deposited thereon by means of hetero-epitaxy.

Alternatively, the substrate may consist of monocrystalline gallium arsenide. Monocrystalline layers of alternately silicon and gallium arsenide may have been deposited thereon by means of hetero-epitaxy.

According to a preferred form of the invention the substrate and the monocrystalline layers grown epitaxially on the substrate consist of a monocrystalline material having a garnet structure.

Epitaxial growth, for example from the liquid phase, of monocrystalline garnet layers physically speaking leads to substantially perfect layers as compared with vapour-deposited layers and which therefore have very few absorption centres and a minimum number of scattering centres. Various types of garnets can form combinations of layers having at least substantially equal lattice constants but different values of refractive index. Dependent on the difference in refractive index a smaller or a larger number of layers with alternately a high and a low refractive index may be used to realize a desired reflection.

A practical embodiment of the invention is characterized in that the substrate is of gadolinium gallium garnet (GGG). GGG can be obtained with a very high optical quality, i.e. a minimum of physical defects and negligible optical inhomogeneities.

For handling electromagnetic radiation in the infrared spectral range a further embodiment of the invention is characterized in that the monocrystalline garnet layers having an odd number when taken from the substrate consist of a material based on yttrium iron garnet and the layers having an even number when taken from the substrate consist of gadolinium gallium garnet.

For example, when alternate layers of yttrium iron garnet (YIG) (n=2.2) and GGG (n=2.0) are grown on a GGG substrate in thicknesses optimised for reflection, it is found that the reflection with an overall number of 2 layers is 18%, with an overall number of 10 layers is 49%, and with an overall number of 16 layers is 69%.

For handling electromagnetic radiation in the optical spectral range a further embodiment of the invention is characterized in that the monocrystalline garnet layers having an odd number when taken from the substrate consist of a material based on $Y_3Al_3Sc_2O_{12}$ and the monocrystalline garnet layers having an even number when taken from the substrate consist of gadolinium gallium garnet.

Besides being useful as a reflecting or antireflecting element in lasers, the optical component according to the invention is also suitable for use in combination with an epitaxial magneto-optically active garnet layer. This may be present on the side of the stack of epitaxial monocrystalline garnet layers remote from the substrate or between the substrate and the stack of epitaxial monocrystalline garnet layers In these cases the thicknesses of the epitaxial monocrystalline garnet layers of the stack are chosen to be so that optimum reflection occurs for the wavelength of the electromagnetic radiation to be used.

The epitaxial magneto-optically active garnet layer, however, may also be provided between a first and a second sub-stack of epitaxial layers, the thicknesses of the layers of the first stack being chosen to be so that optimum reflection occurs for the wavelength of the electromagnetic radiation to be used, the thicknesses of the layers of the second sub-stack being chosen to be so that (optimum) anti-reflection occurs for the wavelengths of the radiation to be used. In this case the first substack may, for example, adjoin the substrate and the electromagnetic radiation to be treated may be incident via the second sub-stack.

BRIEF DESCRIPTION OF THE DRAWINGS

A few embodiments of the invention will be described in greater detail, by way of example, with reference to the drawings, in which:

FIG. 1 is a cross-sectional view of an optical component according to the invention having reflecting properties;

FIGS. 2 and 3 are diagrammatic elevations of two different combinations of an optical component according to the invention with a magneto-optically active layer;

DETAILED DESCRIPTION OF THE PREFERRED EMBODIMENTS

Figure 4:
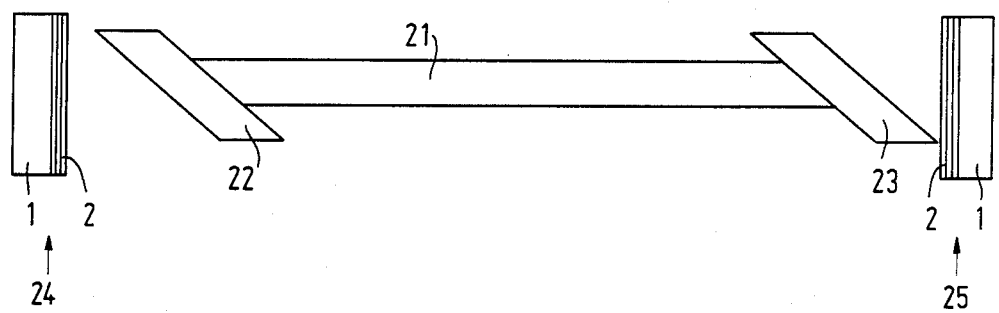
FIG. 4 shows diagrammatically a laser arrangement with two reflecting optical components according to the invention.

FIG. 1 shows a monocrystalline substrate 1, for example, a gadolinium gallium garnet (GGG). A stack 2 of monocrystalline garnet layers 11-16 is deposited epitaxially hereon, for example, from the liquid phase. Substrate 1 with stack 2 constitutes an optical component according to the invention. As regards thickness and refractive index the layers 11-16 are optimised so as to obtain maximum reflection (they may hence be considered as $\frac{1}{4}\lambda$ layers) and alternately have a first refractive index $n_1$ (the layers 11, 13, 15) and a second refractive index $n_2$ (the layers 12, 14, 16), with $n_2 < n_1$. In the case in which the layers 12, 14, 16 consist of GGG ($n_2 = 2.0$) and the layers 11, 13, 15 of YIG ($n_1 = 2.2$), the reflection is 34% ($\lambda = 1000$ nm).

The reflection measured directly at the substrate 1, i.e. without $\frac{1}{4}\lambda$ layers, is 11%. The stack 2 may consist of more than six layers or less than six layers. The reflection as a function of the number of $\frac{1}{4}\lambda$ layers is:

| number of $\frac{1}{4}\lambda$ layers | reflection in % |
| --- | --- |
| 0 | 11 |
| 2 | 18 |
| 4 | 26 |
| 6 | 34 |
| 8 | 42 |
| 10 | 49 |
| 12 | 57 |
| 14 | 63 |
| 16 | 69 |

The lattice constants of GGG and YIG are sufficiently close to each other ($a_o = 12.383$ Å and $a_o = 12.377$ Å, respectively to permit epitaxial growth.

In FIG. 1 I is the incident radiation, R is the reflected radiation, and T is the transmitted radiation.

In the case where maximum reflection is not desired, but rather maximum transmission (hence a system of layers having anti-reflecting properties), the thicknesses and the refractive indices of the layers 11-16 may be optimized for that purpose.

In order to obtain an optital component which is suitable for handling electromagnetic radiation in the optical spectral range, GGG may also be used for the material of the substrate 1 and alternate layers 11, 13, 15 of $Y_3Al_3Sc_2O_{12}$ (n = 1.8) and layers 12, 14, 16 of GGG (n = 2.0) can be deposited hereon epitaxially. The lattice constants of GGG ($a_o = 12.383$ Å) and of $Y_3Al_3Sc_2O_{12}$ ($a_o = 12.38 \pm 0.01$) are sufficiently matched to each other to enable epitaxial growth.

FIG. 2 shows the substrate of FIG. 1 with the stack 2 of epitaxial $\frac{1}{4}\lambda$ layers. In this case an epitaxial garnet layer 3 having magneto-optically active properties is grown on the stack 2. This is, for example, a magnetic bubble garnet layer having a composition based on yttrium iron garnet or on bismuth yttrium iron garnet.

Substrate 1 having layers of stack 2 serves as a reflector for the magneto-optically active layer 3. A magnetic bubble 4 in the layer 3 can be detected by means of a detector. system consisting of a laser source 5, a lens system 6, 7 to focus the radiation of the laser source 5, a polarizer 8, an analyzer 9, a semi-transparent mirror 10 and a detector 20.

In this case detection is carried out from the front of the substrate 1. However, it is also possible to perform the detection from the rear side of the substrate, i.e. through the substrate. An optical component which is suitable for that purpose is shown diagrammatically in FIG. 3. Substrate 1 and stack 2 of layers 11-16 are the same as in FIGS. 1 and 2, only in this case an epitaxial monocrystalline garnet layer 3 having magneto-optically active properties is provided between the substrate 1 and the stack 2. Electromagnetic radiation I is incident via substrate 1, passes through layer 3, is reflected partly by the stack 2 of $\frac{1}{4}\lambda$ layers dependent on the number of layers of the stack 2, passes again through layer 3 and can be detected on the free side of the substrate. The magneto-optically active layer 3 may optionally be present between a sub-stack 2 having reflecting properties and a sub-stack 2' having anti-reflecting properties.

FIG. 4 shows a first type of laser arrangement in which a discharge tube 21 which comprises a Brewster angle window 22, 23 at each end is placed between two mirrors 24, 25. The mirrors 24 and 25 are optical components according to the invention and each consist of a monocrystalline substrate 1 on which a stack 2 of monocrystalline epitaxial garnet layers of alternately a high and a low refractive index is grown. The thicknesses and the refractive indices are optimized for maximum reflection of the radiation of the discharge tube 21.

Figure 5:
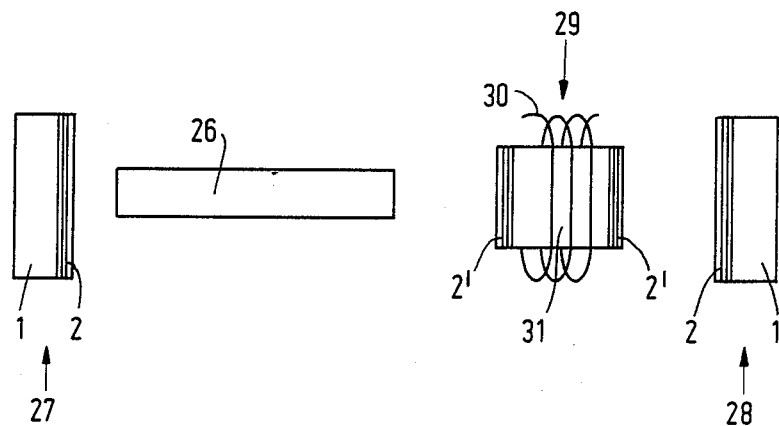
FIG. 5 shows diagrammatically a laser arrangement having two reflecting and two antireflecting components according to the invention.

FIG. 5 shows a second type of laser arrangement. In this case a discharge tube 26 is placed between two mirrors 27, 28 each formed by reflecting optical components according to the invention. In this case a resonant cavity 29 with a magneto-optically active element 31 surrounded by a coil 30 is present between the discharge tube 26 and the mirror 28. Since the highest energies of the present laser system are handled in the resonant cavity 29 it is of great importance for the ends of the magneto-optically active element to have anti-reflecting properties for the radiation of the discharge tube 26. For this purpose the ends of element 31, which is based, for example, on the use of a monocrystalline garnet substrate, each comprise a stack $2^1$ consisting of monocrystalline epitaxial garnet layers having refractive indices and thicknesses which are optimized to minimally reflect radiation of the discharge tube 26.

What is claimed is:

1. A multilayer optical component in thin-film technology for handling electromagnetic radiation which is incident transversely to the plane of the component, having a substrate which supports a stack of thin-film layers having alternatively a high and a low refractive index, characterized in that the substrate is a monocrystalline substrate having a lattice constant $a_o$; that the stack of thin-film layers consists of a number of monocrystalline layers grown epitaxially from the liquid phase on the substrate and having a lattice constant which is substantially equal to $a_o$; and that the component is effective for handling electromagnetic radiation which is selected from (1) the visible and (2) the visible and infrared spectral range.

2. An optical component as claimed in claim 1, characterized in that the monocrystalline layers which, taken from the substrate, have an even number consist of the same material as the substrate.

3. An optical component as claimed in claim 1, characterized in that the substrate and the monocrystalline layers grown epitaxially on the substrate consist of a monocrystalline material having a garnet structure.

4. An optical component as claimed in claim 3, characterized in that the substrate is of gadolinium gallium garnet.

5. An optical component as claimed in claim 4, characterized in that the monocrystalline garnet layers having an odd number when taken from the substrate consist of a material based on yttrium iron garnet and the layers having an even number when taken from the substrate consist of gadolinium gallium garnet for handling electromagnetic radiation in the infrared spectral range.

6. An optical component as claimed in claim 4, characterized in that the monocrystalline garnet layers having an odd number when taken from the substrate consist of a material based on $Y_3Al_3Sc_2O_{12}$ and the monocrystalline layers having an even number when taken from the substrate consist of gadolinium gallium garnet for handling electromagnetic radiation in the visible spectral range.

7. An optical component as claimed in claim 3, characterized in that the stack of monocrystalline garnet layers adjoins the substrate and that a magneto-optically active, epitaxial monocrystalline layer is provided on the side of the stack remote from the substrate.

8. An optical component as claimed in claim 3, characterized in that the substrate supports an epitaxial magneto-optically active monocrystalline garnet layer and that the stack of monocrystalline garnet layers is grown epitaxially on the magneto-optically active garnet layer.

9. An optical component as claimed in claims 3, characterized in that the substrate supports an epitaxial magneto-optically active monocrystalline garnet layer which is enclosed between a first stack of monocrystalline garnet layers having thicknesses which are optimized for reflection of electromagnetic radiation of a given wavelength and a second sub-stack of monocrystalline garnet layers having thicknesses which are optimized for antireflection of electromagnetic radiation of the said given wavelength.

10. A multilayer optical component comprising a monocrystalline substrate having a lattice constant $a_o$ which supports a stack of thin-film layers having alternatively a high and low refractive index, said stack consisting of a number of monocrystalline layers epitaxially grown on said substrate from the liquid phase and having a lattice constant which is substantially equal to $a_o$.

11. An optical component as claimed in claim 10 in which the substrate and the monocrystalline layers consist of a monocrystalline material having a garnet structure.

12. An optical component as claimed in claim 11 in which the monocrystalline layers having an odd number when taken from the substrate consists of a material based on yttrium iron garnet and the layers having an even number when taken from the substrate consist of gadolinium gallium garnet.

13. An optical component as claimed in claim 11 in which the substrate supports an epitaxial magneto-optically active monocrystalline garnet layer and a stack of monocrystalline layers epitaxially grown from the liquid phase on the epitaxial magneto optically active garnet layer.

14. An optical component as claimed in claim 11 in which the monocrystalline material is gadolinium gallium garnet.

15. A multiplayer optical component comprising a monocrystalline substrate having a lattice constant $a_o$ which supports a stack of thin-film layers having alternatively a high and low refractive index, said stack consisting of a number of monocrystalline layers epitaxially grown on said substrate from the liquid phase and having a lattice constant which is substantially equal to $a_o$, the monocrystalline layers which, taken from the substrate, have an even number consisting of the same material as the substrate, the substrate and the monocrystalline layers grown epitaxially thereon consisting of a monocrystalline material having a garnet structure.

16. An optical component as claimed in claim 15 in which the substrate is gadolinium gallium garnet.

17. An optical component as claimed in claim 16 wherein the stack of monocrystalline garnet layers adjoins the substrate and a magneto-optically active, epitaxial monocrystalline layer is provided on the side of the stack remote from the substrate.

18. An optical component as claimed in claim 16 wherein the substrate supports an epitaxial magneto-optically active monocrystalline garnet layer and the stack of monocrystalline garnet layers is grown epitaxially on the magneto-optically active garnet layer.

19. An optical component as claimed in claim 16 wherein the substrate supports an epitaxial magneto-optically active monocrystalline garnet layer which is enclosed between a first stack of monocrystalline garnet layers having thicknesses which are optimized for reflection of electromagnetic radiation of a given wavelength and a second sub-stack of monocrystalline garnet layers having thicknesses which are optimized for anti-reflection of electromagnetic radiation of the said given wavelength.

20. A multilayer optical component comprising a monocrystalline gadolinium gallium garnet substrate having a lattice constant $a_o$ which supports a stack of thin-film layers having alternatively a high and low refractive index, said stack consisting of a number of monocrystalline layers epitaxially grown on said substrate from the liquid phase and having a lattice constant which is substantially equal to $a_o$, the monocrystalline layers having an odd number when taken from the substrate being selected from a member of the group consisting of (1) a material based on yttrium iron garnet; and (2) a material based on $Y_3Al_3Sc_2O_{12}$; and the monocrystalline layers having an even number when taken from the substrate consisting of gadolinium gallium garnet.

21. A multilayer optical component as claimed in claim 20 wherein a magneto-optically active yttrium iron garnet material is grown epitaxially on said stack of thin-film layers.

22. A multilayer optical component as claimed in claim 20 wherein a magneto-optically active bismuth yttrium iron garnet is epitaxially grown on said stack of thin-film layers.

23. A laser comprising at least one optical component for handling electromagnetic radiation which is incident transversely to the plane of the component, having a substrate which supports a stack of thin-film layers having alternatively a high and a low refractive index, wherein said substrate is a monocrystalline substrate having a lattice constant $a_o$; the stack of thin-film layers consists of a number of monocrystalline layers grown epitaxially from the liquid phase on the substrate and having a lattice constant which is substantially equal to $a_o$; and the component is effective for handling electromagnetic radiation which is selected from (1) the visible and (2) the visible and infrared spectral range.

24. A laser as claimed in claim 23 wherein the substrate and the monocrystalline layers grown epitaxially on the substrate consist of a monocyrstalline material having a garnet structure.

25. A laser comprising at least one multilayer optical component comprising a monocrystalline substrate having a lattice constant $a_o$ which supports a stack of thin-film layers having alternatively a high and low refractive index, said stack consisting of a number of monocrystalline layers epitaxially grown on said substrate from the liquid phase and having a lattice constant which is substantially equal to $a_o$.

26. A laser as claimed in claim 25 in which the substrate and the monocrystalline layers consist of a monocrystalline material having a garnet structure.

27. A laser as claimed in claim 26 in which the monocrystalline layers having an odd number when taken from the substrate consists of a material based on yttrium iron garnet and the layers having an even number when taken from the substrate consist of gadolinium gallium garnet.

28. A laser as claimed in claim 26 in which the substrate supports an epitaxial magneto-optically active monocrystalline garnet layer and a stack of monocrystalline layers epitaxially grown from the liquid phase on the epitaxial magneto-optically active garnet layer.

29. A laser comprising at least one optical component comprising a monocrystalline substrate having a lattice constant $a_o$ which supports a stack of thin-film layers having alternatively a high and low refractive index, said stack consisting of a number of monocrystalline layers epitaxially grown on said substrate from the liquid phase and having a lattice constant which is substantially equal to $a_o$, the monocrystalline layers which, taken from the substrate have an even number consisting of the same material as the substrate, the substrate and the monocrystalline layers grown epitaxially thereon consisting of a monocrystalline material having a garnet structure.

30. A laser as claimed in claim 29 in which the substrate is gadolinium gallium garnet.

31. A laser as claimed in claim 30 in which the stack of monocrystalline garnet layers adjoins the substrate and a magneto-optically active, epitaxial monocrystalline layer is provided on the side of the stack remote from the substrate.

32. A laser as claimed in claim 30 in which the substrate supports an epitaxial magneto-optically active monocrystalline garnet layer and the stack of monocrystalline garnet layers is grown epitaxially on the magneto-optically active garnet layer.

33. A laser as claimed in claim 30 in which the substrate supports an epitaxial magneto-optically active monocrystalline garnet layer which is enclosed between a first stack of monocrystalline garnet layers having thicknesses which are optimized for reflection of electromagnetic radiation of a given wavelength and a second sub-stack of monocrystalline garnet layers having thicknesses which are optimized for anti-reflection of electromagnetic radiation of the said given wavelength.

34. A laser comprising at least one multilayer optical component comprising a monocrystalline gadolinium gallium garnet substrate having a lattice constant $a_o$ which supports a stack of thin-film layers having alternately a high and low refractive index, said stack consisting of a number of monocrystalline layers epitaxially grown on said substrate from the liquid phase equal to $a_o$, the monocrystalline layers having an odd number when taken from the substrate being selected from a member of the group consisting of (1) a material based on yttrium iron garnet; and (2) a material based on $Y_3Al_3Sc_2O_{12}$; and the monocrystalline layers having an even number when taken from the substrate consisting of gadolinium gallium garnet.

35. A laser as claimed in claim 34 in which a magneto-optically active yttrium garnet material is grown epitaxially on said stack of thin-film layers.

36. A laser as claimed in claim 34 in which a magneto-optically active bismuth yttrium iron garnet is epitaxially grown on said stack of thin-film layers.

* * * * *